(12) United States Patent
Miyairi et al.

(10) Patent No.: US 10,850,223 B2
(45) Date of Patent: Dec. 1, 2020

(54) PLUGGED HONEYCOMB STRUCTURE

(71) Applicant: NGK INSULATORS, LTD., Nagoya (JP)

(72) Inventors: Yukio Miyairi, Nagoya (JP); Kazuto Miura, Nagoya (JP); Tomohiro Iida, Nagoya (JP); Takashi Aoki, Nagoya (JP); Osamu Yasui, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 598 days.

(21) Appl. No.: 15/704,326

(22) Filed: Sep. 14, 2017

(65) Prior Publication Data

US 2018/0104635 A1   Apr. 19, 2018

(30) Foreign Application Priority Data

Oct. 19, 2016   (JP) .................................. 2016-205262

(51) Int. Cl.
  *B01D 46/00*   (2006.01)
  *F01N 3/02*   (2006.01)
  (Continued)

(52) U.S. Cl.
  CPC ....... *B01D 46/247* (2013.01); *B01D 46/0063* (2013.01); *B01D 46/2418* (2013.01); *B01D 46/2425* (2013.01); *B01D 46/2429* (2013.01); B01D 2046/2481 (2013.01); B01D 2046/2492 (2013.01); B01D 2279/30 (2013.01); *F01N 3/0222* (2013.01); F01N 2330/06 (2013.01); F01N 2330/32 (2013.01); F01N 2330/34 (2013.01); F01N 2330/48 (2013.01)

(58) Field of Classification Search
  CPC .............. F01N 3/0222; B01D 39/2068; B01D 46/2418; B01D 46/2451; B01D 46/247; B01D 46/2425
  See application file for complete search history.

(56) References Cited

U.S. PATENT DOCUMENTS 4,448,828 A * 5/1984 Mochida ................ B01D 53/86
                                                         428/34.4
7,244,284 B2 * 7/2007 Miwa ..................... B01D 45/16
                                                         422/177

(Continued)

FOREIGN PATENT DOCUMENTS

JP        2003-010616 A1    1/2003

*Primary Examiner* — Robert A Hopkins
(74) *Attorney, Agent, or Firm* — Burr & Brown, PLLC

(57) ABSTRACT

A plugged honeycomb structure includes a plurality of honeycomb segments, a bonding layer, and plugging portions plugging open ends of cells of the honeycomb segments. The honeycomb segments include circumferential segments and central segments. The circumferential segments include at least one specific circumferential segment in which pressure loss with soot when an amount of the deposited soot is 4 g/L is higher than the pressure loss with soot of the central segment as much as 15% or more and in which an open frontal area of the circumferential segment is the same as or larger than an open frontal area of the central segment. In a cross section of a honeycomb structure body which is perpendicular to an extending direction of the cells, a ratio of an area of the specific circumferential segment is 4% or more to a total area of the circumferential segments and the central segments.

5 Claims, 8 Drawing Sheets

(51) Int. Cl.
    *B01D 46/24*     (2006.01)
    *F01N 3/022*     (2006.01)

(56) References Cited

U.S. PATENT DOCUMENTS

| | | | | |
|---|---|---|---|---|
| 8,092,565 | B2* | 1/2012 | Yamada | B01D 46/2455 422/177 |
| 9,932,873 | B2* | 4/2018 | Aoki | B01D 46/2429 |
| 9,993,813 | B2* | 6/2018 | Omiya | C04B 41/87 |
| 2004/0142145 | A1 | 7/2004 | Hashimoto et al. | |
| 2008/0155952 | A1* | 7/2008 | Okazaki | B01D 46/2429 55/523 |
| 2009/0004073 | A1* | 1/2009 | Gleize | F01N 3/0222 422/180 |
| 2011/0230335 | A1* | 9/2011 | Yamada | C04B 35/6263 502/100 |
| 2014/0041350 | A1* | 2/2014 | Aoki | B01D 46/247 55/529 |
| 2014/0298779 | A1* | 10/2014 | Miyairi | F01N 3/022 60/298 |
| 2014/0311112 | A1* | 10/2014 | Toyoshima | B01D 46/2474 55/529 |
| 2015/0037220 | A1* | 2/2015 | Goto | F01N 3/0222 422/171 |
| 2015/0037221 | A1* | 2/2015 | Shibata | B01D 53/94 422/177 |
| 2015/0037532 | A1* | 2/2015 | Shibata | B01D 46/247 428/117 |

\* cited by examiner

PLUGGED HONEYCOMB STRUCTURE

The present application is an application based on JP-2016-205262 filed on Oct. 19, 2016 with Japan Patent Office, the entire contents of which are incorporated herein by reference.

BACKGROUND OF THE INVENTION

Field of the Invention

The present invention relates to a plugged honeycomb structure, and more particularly, it relates to a plugged honeycomb structure which is excellent in regeneration efficiency during regeneration to burn and remove soot trapped by partition walls.

Description of the Related Art

From the viewpoints of influence on the global environment and resource saving, improvement of car fuel efficiency has been required in recent years. Consequently, internal combustion engines such as a direct injection type gasoline engine and a diesel engine, which are excellent in heat efficiency, have a tendency to be used as power sources for cars.

On the other hand, these internal combustion engines have the problem of generation of cinders during combustion of fuel. From the viewpoint of the atmospheric environment, there are required countermeasures to remove harmful components included in an exhaust gas and to simultaneously prevent particulate matter (hereinafter referred to as "PM" sometimes) such as soot from being discharged to the atmospheric air.

In particular, regulations on removal of the PM emitted from the diesel engine have a tendency to be worldwide strengthened. Furthermore, attention is attracted to use of a wall flow type exhaust gas purifying filter of a honeycomb structure as a trapping filter (hereinafter referred to as "DPF (a diesel particulate filter)" sometimes) to remove the PM, and various systems have been suggested. The above DPF is usually a structure in which porous partition walls define a plurality of cells forming through channels for a fluid, and the cells are alternately plugged, whereby the porous partition walls forming the cells perform a function of the filter. A pillar-shaped structure in which the porous partition walls define the plurality of cells will be referred to as "a honeycomb structure" sometimes. Furthermore, the honeycomb structure in which open ends of the formed cells are plugged with plugging portions will be referred to as "a plugged honeycomb structure" sometimes. The plugged honeycomb structure is broadly used as a trapping filter such as the DPF. When an exhaust gas containing the particulate matter flows into the plugged honeycomb structure from an inflow end face (a first end face) of the plugged honeycomb structure and when the exhaust gas passes through the partition walls, the particulate matter in the exhaust gas is filtered, and the purified exhaust gas is emitted from an outflow end face (a second end face) of the plugged honeycomb structure.

As the honeycomb structure for use in the DPF or the like, for example, a honeycomb structure of a segmented structure has been suggested in which a plurality of honeycomb segments are bonded and formed (e.g., see Patent Document 1).

In a honeycomb filter such as the DPF, pressure loss gradually increases due to the PM deposited in the filter with an elapse of time, and hence regeneration is performed to burn and remove the PM deposited in the honeycomb filter at a regular interval. As a method of regenerating the DPF, for example, there is known a regenerating method of raising a temperature of the exhaust gas emitted from the engine and heating the DPF by use of the high-temperature exhaust gas.

[Patent Document 1] JP-A-2003-10616

SUMMARY OF THE INVENTION

A honeycomb structure of a segmented structure disclosed in Patent Document 1 has the problem of a low regeneration efficiency during regeneration to burn and remove PM deposited in a filter.

The present invention has been developed in view of such problems of a conventional technology. According to the present invention, there is provided a plugged honeycomb structure which is excellent in regeneration efficiency during regeneration to burn and remove soot trapped by partition walls.

The present inventors have carried out various studies on reasons why the above-mentioned regeneration efficiency is low in the honeycomb structure of the segmented structure. The present inventors have found that during the regeneration of the honeycomb structure of the segmented structure, a temperature of a circumferential portion of the honeycomb structure hardly rises and that unburned soot in this circumferential portion becomes a large factor for deterioration of the regeneration efficiency, and the present inventors have completed the present invention. Consequently, according to the present invention, there is provided a plugged honeycomb structure mentioned below.

According to a first aspect of the present invention, a plugged honeycomb structure is provided including a pillar-shaped honeycomb structure body having porous partition walls arranged to surround a plurality of cells extending from an inflow end face to an outflow end face and forming through channels for a fluid; and plugging portions each of which is disposed in an end portion of the cell on the side of one of the inflow end face and the outflow end face, wherein the honeycomb structure body is constituted of a honeycomb segment bonded body having a plurality of prismatic columnar honeycomb segments, and a bonding layer bonding side surfaces of the honeycomb segments to one another, the plurality of honeycomb segments include a plurality of circumferential segments arranged in a circumferential portion in a cross section of the honeycomb structure body which is perpendicular to an extending direction of the cells, and central segments which are the honeycomb segments other than the circumferential segments and are arranged in a central portion in the cross section, the circumferential segments include at least one specific circumferential segment in which pressure loss with soot when an amount of the deposited soot is 4 g/L is higher than the pressure loss with soot of the central segment as much as 15% or more and in which an open frontal area of the circumferential segment is the same as or larger than an open frontal area of the central segment, and in the cross section of the honeycomb structure body which is perpendicular to the cell extending direction, a ratio of an area of the specific circumferential segment is 4% or more to a total area of the circumferential segments and the central segments.

According to a second aspect of the present invention, the plugged honeycomb structure according to the above first aspect is provided, wherein the cells including the plugging portions arranged in the end portions on the outflow end face side are defined as inflow cells, and the cells including the plugging portions arranged in the end portions on the inflow end face side are defined as outflow cells, and in the honeycomb segments other than the specific circumferential segment, a shape of the inflow cells in the cross section perpendicular to the cell extending direction is hexagonal, a shape of the outflow cells in the cross section perpendicular to the cell extending direction is square, the plurality of cells have a structure in which four inflow cells surround one outflow cell so that one side of the predetermined inflow cell and one side of the adjacent outflow cell have the same length and are disposed in parallel with each other, a distance a that is a distance between the partition wall forming a first side of the outflow cell and the partition wall forming a second side facing the first side of the outflow cell is in a range in excess of 0.8 mm and smaller than 2.4 mm, and a ratio, to the distance a, of a distance b that is a distance between the partition wall forming a third side of the inflow cell parallel and adjacent to the one side of the outflow cell and the partition wall forming a fourth side facing the third side of the inflow cell is in a range in excess of 0.4 and smaller than 1.1.

According to a third aspect of the present invention, the plugged honeycomb structure according to the above second aspect is provided, wherein the inflow cell in the honeycomb segments other than the specific circumferential segment further includes a dividing wall connecting a central portion of the third side to a central portion of the fourth side in a direction perpendicular to the cell extending direction.

According to a fourth aspect of the present invention, the plugged honeycomb structure according to the above second or third aspects is provided, wherein the honeycomb segments other than the specific circumferential segment are the central segments.

According to a fifth aspect of the present invention, the plugged honeycomb structure according to any one of the above second to fourth aspects is provided, wherein in the specific circumferential segment, shapes of the cells in the cross section perpendicular to the cell extending direction are quadrangular or are different between the inflow cell and the outflow cell.

A plugged honeycomb structure of the present invention is a so-called plugged honeycomb structure of a segmented structure, and circumferential segments arranged in a circumferential portion of a honeycomb structure body include a specific circumferential segment indicating specific pressure loss with soot. Consequently, in the plugged honeycomb structure of the present invention, the specific circumferential segment is constituted so that any soot does not accumulate as compared with the other honeycomb segments. Consequently, in the plugged honeycomb structure of the present invention, a regeneration efficiency can improve as compared with a conventional plugged honeycomb structure of a segmented structure.

DESCRIPTION OF THE PREFERRED EMBODIMENTS

Figure 1:
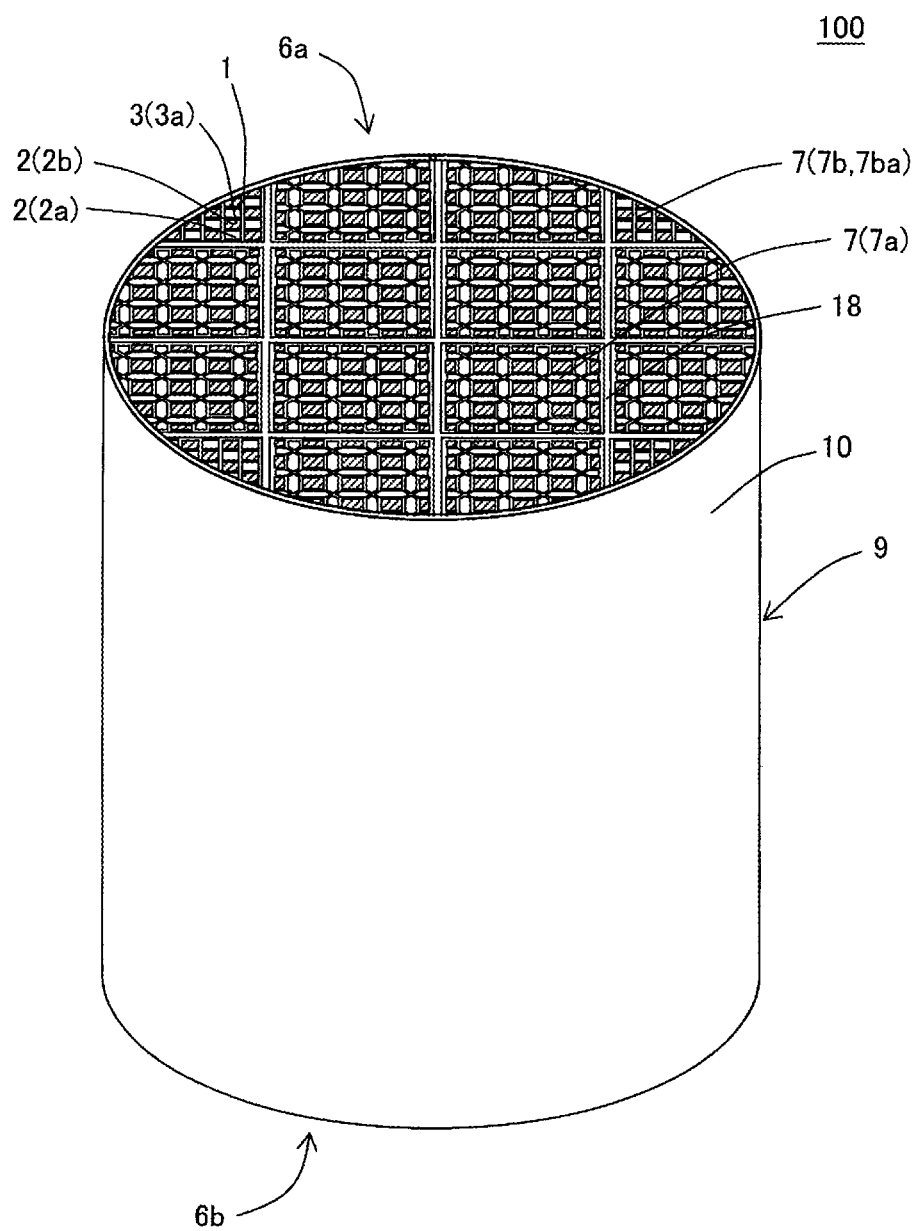
FIG. 1 is a perspective view schematically showing one embodiment of a plugged honeycomb structure of the present invention and seen from an inflow end face side.

Hereinafter, embodiments of the present invention will be described, but the present invention is not limited to the following embodiments. Therefore, it should be understood that the following embodiments to which changes, improvements and the like are suitably added also fall in the scope of the present invention on the basis of ordinary knowledge of a person skilled in the art without departing from the gist of the present invention.

(1) Plugged Honeycomb Structure:

As shown in FIG. 1 to FIG. 9, a first embodiment of a plugged honeycomb structure of the present invention is a plugged honeycomb structure 100 including a honeycomb structure body 9 and plugging portions 3. The honeycomb structure body 9 has a pillar shape and includes porous partition walls 1 arranged to surround a plurality of cells 2 extending from an inflow end face 6a to an outflow end face 6b and forming through channels for a fluid. Each plugging portion 3 is disposed in an end portion of the cell 2 on the side of one of the inflow end face 6a and the outflow end face 6b. The plugged honeycomb structure 100 further includes, at its circumference, an outer wall 10 disposed to surround the honeycomb structure body 9.

Figure 2:
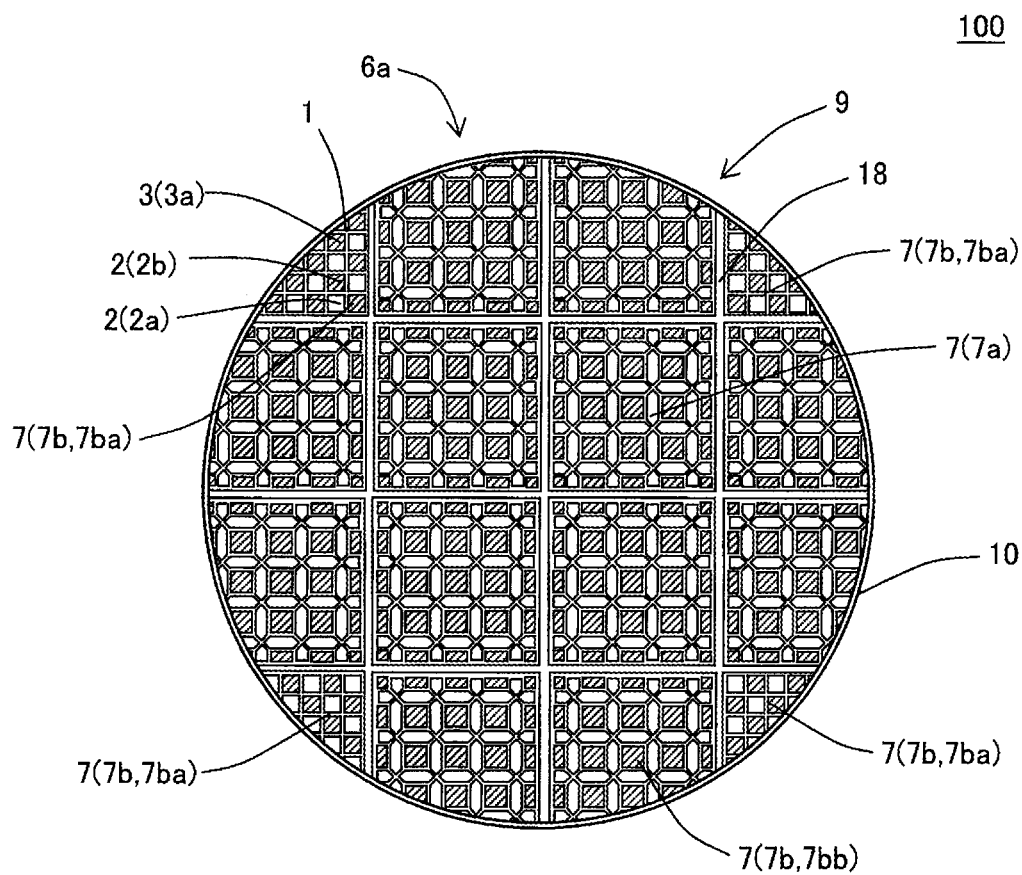
FIG. 2 is a plan view seen from the inflow end face side of the plugged honeycomb structure shown in FIG. 1.
Figure 3:
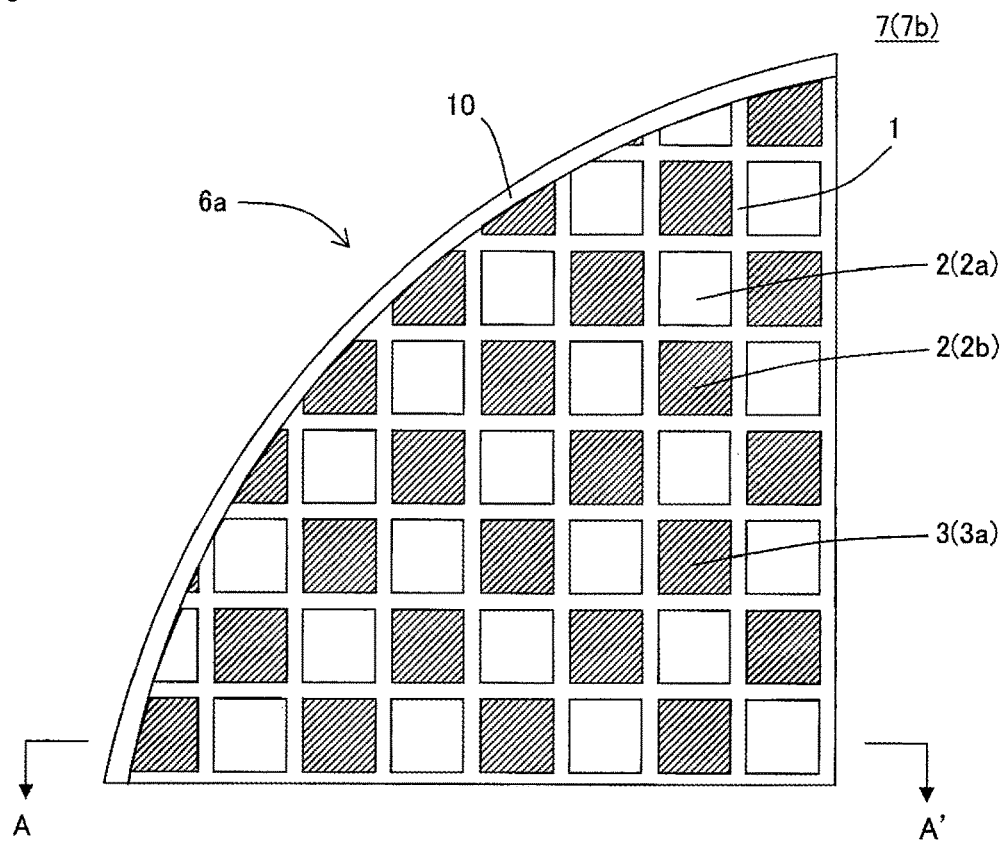
FIG. 3 is a plan view of an inflow end face of a specific circumferential segment of the plugged honeycomb structure shown in FIG. 1.
Figure 4:
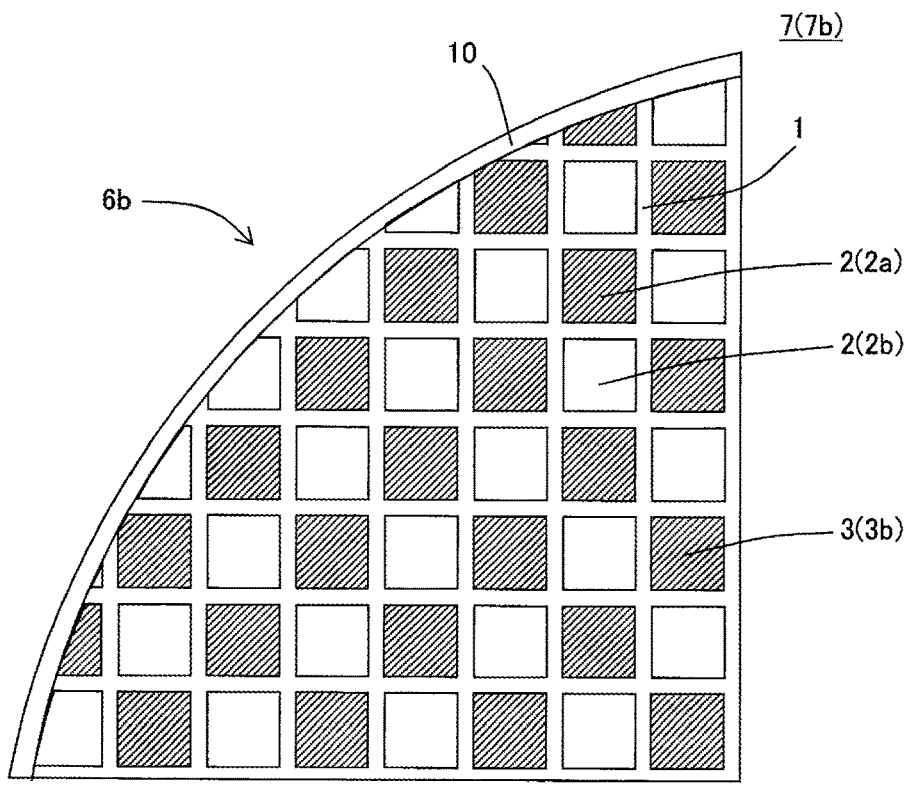
FIG. 4 is a plan view of an outflow end face of the specific circumferential segment of the plugged honeycomb structure shown in FIG. 1.
Figure 5:
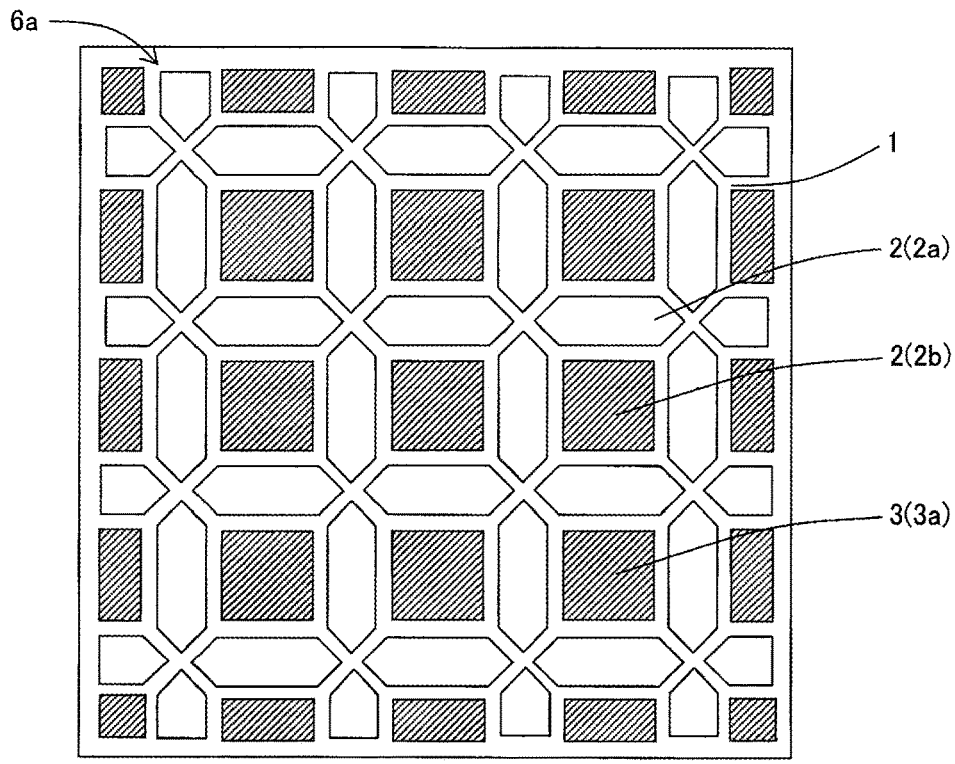
FIG. 5 is a plan view of an inflow end face of a central segment of the plugged honeycomb structure shown in FIG. 1.
Figure 6:
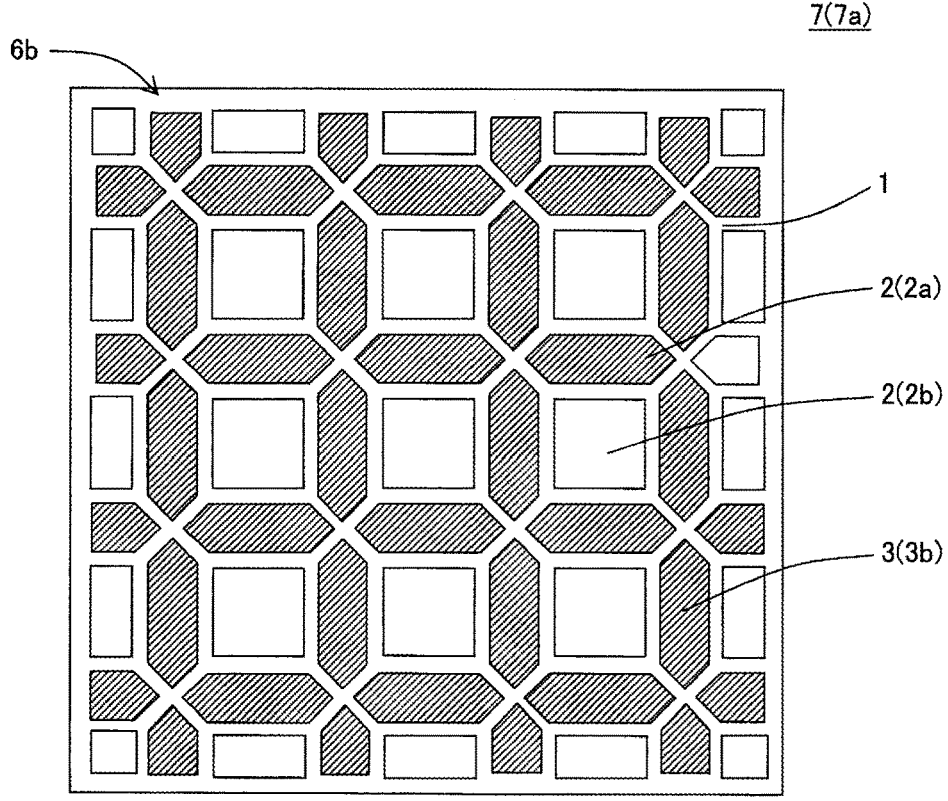
FIG. 6 is a plan view of an outflow end face of the central segment of the plugged honeycomb structure shown in FIG. 1.
Figure 7:
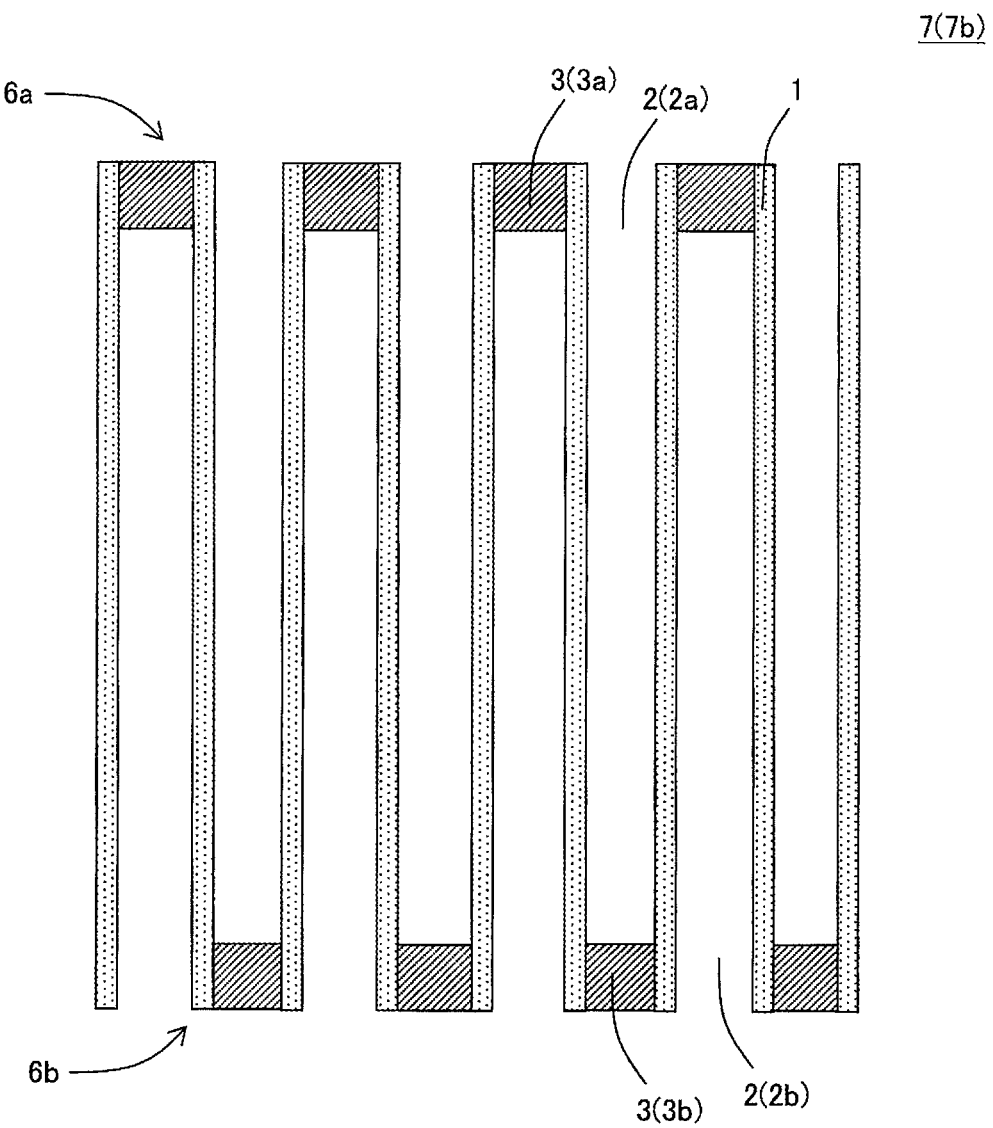
FIG. 7 is a cross-sectional view schematically showing a cross section taken along the A-A' line of FIG. 3.
Figure 8:
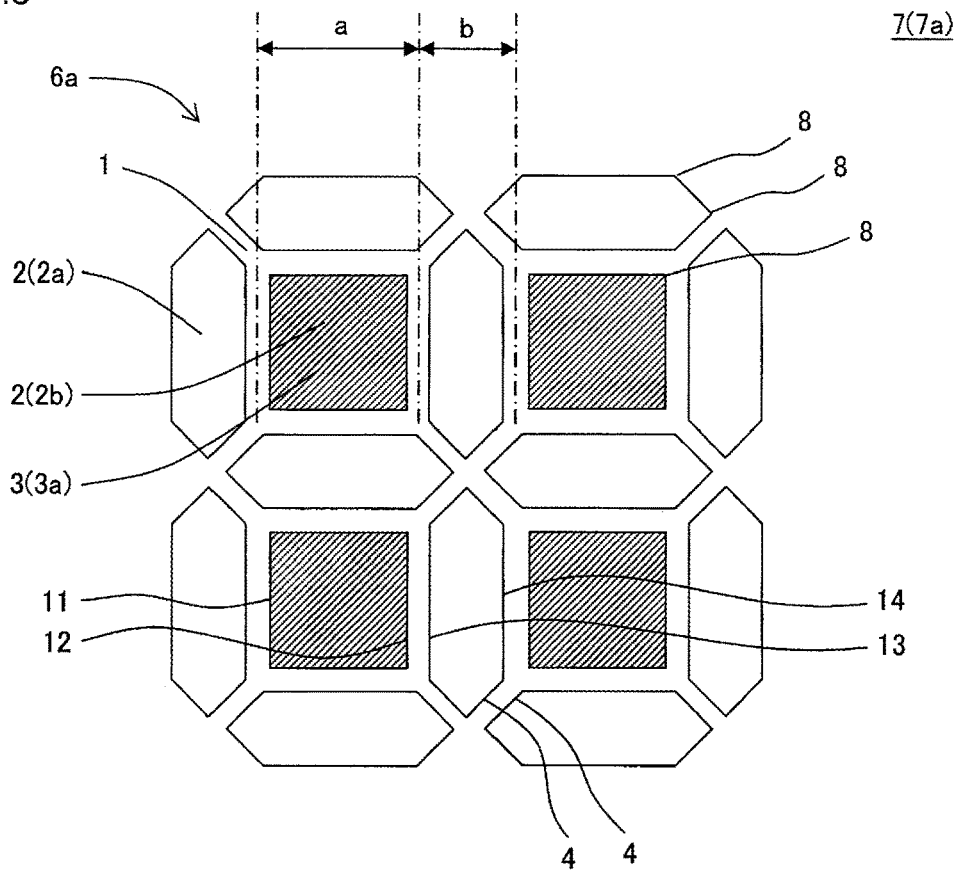
FIG. 8 is an enlarged plan view of an enlarged part of the central segment shown in FIG. 5.
Figure 9:
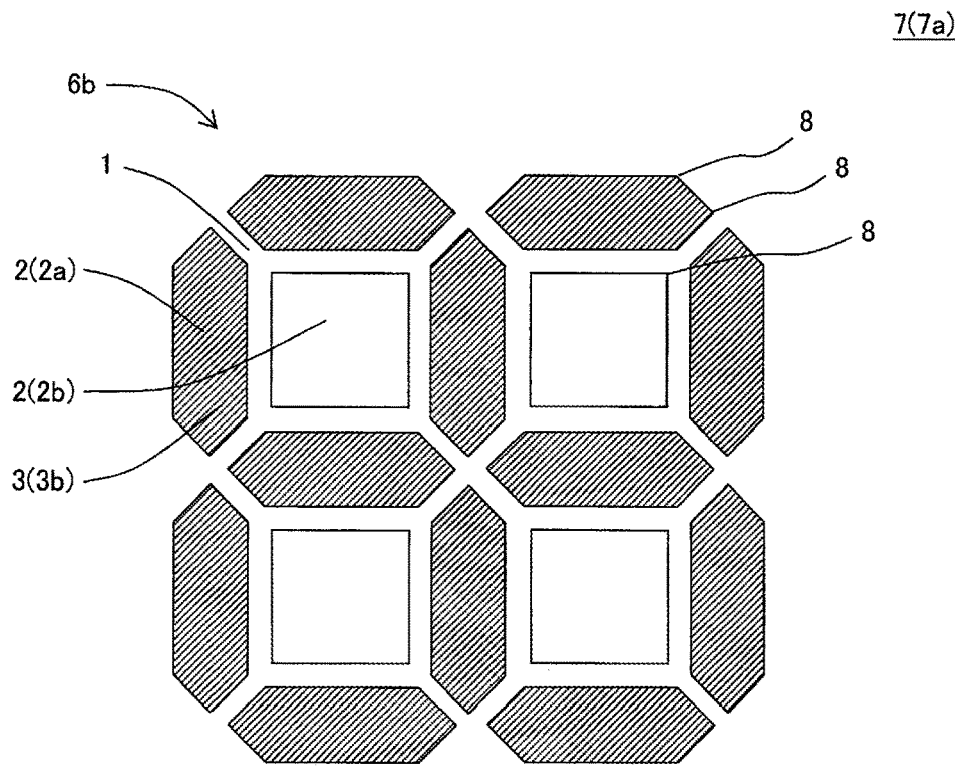
FIG. 9 is an enlarged plan view of an enlarged part of the central segment shown in FIG. 6.

Here, FIG. 1 is a perspective view schematically showing the one embodiment of the plugged honeycomb structure of the present invention and seen from the inflow end face side. FIG. 2 is a plan view seen from the inflow end face side of the plugged honeycomb structure shown in FIG. 1. FIG. 3 is a plan view of an inflow end face of a specific circumferential segment of the plugged honeycomb structure shown in FIG. 1. FIG. 4 is a plan view of an outflow end face of the specific circumferential segment of the plugged honeycomb structure shown in FIG. 1. FIG. 5 is a plan view of an inflow end face of a central segment of the plugged honeycomb structure shown in FIG. 1. FIG. 6 is a plan view of an outflow end face of the central segment of the plugged honeycomb structure shown in FIG. 1. FIG. 7 is a cross-sectional view schematically showing a cross section taken along the A-A' line of FIG. 3. FIG. 8 is an enlarged plan view of an enlarged part of the central segment shown in FIG. 5. FIG. 9 is an enlarged plan view of an enlarged part of the central segment shown in FIG. 6.

The honeycomb structure body 9 is constituted of a honeycomb segment bonded body having a plurality of prismatic columnar honeycomb segments 7 and a bonding layer 18 bonding side surfaces of the honeycomb segments 7 to one another. In other words, the plugged honeycomb structure 100 of the present embodiment is a so-called plugged honeycomb structure of a segmented structure.

As shown in FIG. 1 and FIG. 2, each of the honeycomb segments 7 has the porous partition walls 1 defining the plurality of cells 2 extending from the inflow end face 6a into which the fluid flows to the outflow end face 6b from which the fluid flows out, and a segment circumferential wall disposed at the outermost circumference. The side surfaces of the plurality of honeycomb segments 7 are bonded to one another via the bonding layer 18.

The plurality of honeycomb segments 7 include circumferential segments 7b and central segments 7a. The circumferential segments 7b are the honeycomb segments 7 arranged in a circumferential portion in a cross section of the honeycomb structure body 9 which is perpendicular to an extending direction of the cells 2. In other words, the circumferential segments 7b are the honeycomb segments 7 arranged to come in contact with the outer wall 10 disposed to surround the honeycomb structure body 9, and a plurality of circumferential segments are usually present. The circumferential segment 7b is formed into a pillar shape by grinding a part of the prismatic columnar honeycomb segment 7 along a shape of the outer wall 10.

The central segments 7a are the honeycomb segments 7 other than the circumferential segments 7b and are the honeycomb segments 7 arranged in a central portion in the above-mentioned cross section. One or at least two central segment 7a is usually present. The central segment 7a is formed into a prismatic columnar shape so that a direction from the inflow end face 6a toward the outflow end face 6b becomes an axial direction.

The plugged honeycomb structure 100 of the present embodiment has important characteristics that the circumferential segments 7b include at least one specific circumferential segment 7ba mentioned below. In the specific circumferential segment 7ba, pressure loss with soot when an amount of the deposited soot is 4 g/L is higher than pressure loss with soot of the central segment 7a as much as 15% or more. In other words, when the pressure loss with soot of the central segment 7a is 100%, the pressure loss with soot of the specific circumferential segment 7ba is 115% or more. Hereinafter, "the pressure loss with soot" simply mentioned in the present description means "the pressure loss with soot when the amount of the deposited soot is 4 g/L". Furthermore, an open frontal area of the specific circumferential segment 7ba is the same as or larger than an open frontal area of the central segment 7a.

The specific circumferential segment 7ba is constituted so that the soot does not accumulate as compared with the other honeycomb segments 7. Consequently, in the plugged honeycomb structure 100 of the present embodiment, a regeneration efficiency can improve as compared with a conventional plugged honeycomb structure of the segmented structure. When the pressure loss with soot of the central segment 7a is defined as 100% and when the pressure loss with soot of the specific circumferential segment 7ba is smaller than 115%, a difference is hardly made in soot accumulation degree between the central segment 7a and the specific circumferential segment 7ba, and it is difficult to increase the regeneration efficiency. In this case, when the open frontal area of the specific circumferential segment 7ba is smaller than the open frontal area of the central segment 7a, the pressure loss with soot of the whole plugged honeycomb structure increases. Consequently, in the plugged honeycomb structure 100 of the present embodiment, the open frontal area of the specific circumferential segment 7ba is the same as or larger than the open frontal area of the central segment 7a, to inhibit the increase of the pressure loss with soot of the whole plugged honeycomb structure.

The pressure loss with soot of the specific circumferential segment 7ba is higher than the pressure loss with soot of the central segment 7a as much as preferably from 15 to 50% and further preferably from 30 to 43%. According to this constitution, the regeneration efficiency can further improve.

Hereinafter, a method of measuring the pressure loss with soot of the specific circumferential segment will be described. Initially, there are prepared a plurality of honeycomb segments having a cell structure similar to a cell structure of the specific circumferential segment of a measurement target. Next, the plurality of prepared honeycomb segments are used to prepare the plugged honeycomb structure constituted similarly to the plugged honeycomb structure having the specific circumferential segment of the measurement target. Next, the prepared plugged honeycomb structure is mounted in an exhaust system of a diesel engine for a car which has a displacement of 2 L, and this diesel engine is operated to deposit the soot in the plugged honeycomb structure. It is to be noted that the diesel engine is operated at an engine rotation number of 2000 rotations/minute to obtain an exhaust temperature at 250° C. As to the plugged honeycomb structure, mass increase due to the deposition of the soot and the pressure loss are measured continuously from the start of the operation of the diesel engine. Then, the pressure loss when the amount of the soot deposited in the plugged honeycomb structure is 4 g/L is defined as the pressure loss with soot of the specific circumferential segment. The amount (g/L) of the deposited soot in the present description indicates the amount (g) of the soot deposited per unit volume (L) of the plugged honeycomb structure. It is to be noted that the unit volume (L) of the plugged honeycomb structure is a volume of a portion of the plugged honeycomb structure which excludes the outer wall (including a volume of the cells).

A method of measuring the pressure loss with soot of the central segment can be performed in conformity with the above-mentioned method of measuring the pressure loss with soot of the specific circumferential segment. In other words, initially, there are prepared a plurality of honeycomb segments having a cell structure similar to a cell structure of the central segment of a measurement target. Next, the plurality of prepared honeycomb segments are used to prepare the plugged honeycomb structure constituted similarly to the plugged honeycomb structure having the central segment of the measurement target. Afterward, the pressure loss with soot of the central segment is measured in the same manner as in the above-mentioned method of measuring the pressure loss with soot of the specific circumferential segment.

In case of comparison of the pressure loss with soot of the specific circumferential segment with the pressure loss with soot of the central segment, as described above, the single honeycomb segment of the same shape is used to prepare each plugged honeycomb structure of the same shape, and the pressure loss with soot is measured by the same method. By the comparison of the measured values of the pressure loss with soot, it is possible to obtain an increase ratio of the pressure loss with soot of the specific circumferential segment to the pressure loss with soot of the central segment.

In the plugged honeycomb structure of the present embodiment, the open frontal area of the specific circumferential segment is the same as or larger than the open frontal area of the central segment. When the open frontal area of the central segment is defined as a ratio of 100%, the open frontal area of the specific circumferential segment has a ratio of preferably from 100 to 150% and further preferably from 100 to 120%. When the open frontal area of the specific circumferential segment is smaller than the open frontal area of the central segment, during regeneration, a temperature of a circumferential portion of the plugged honeycomb structure hardly rises, and it is difficult to increase the regeneration efficiency. The open frontal area of the specific circumferential segment is obtainable as a ratio of a total area $S1a$ of inflow cells and a total area $S1b$ of outflow cells in the specific circumferential segment to an area $S1$ of the specific circumferential segment in the cross section perpendicular to the cell extending direction. In other words, the open frontal area of the specific circumferential segment is obtainable in accordance with Equation (1) mentioned below. The open frontal area of the central segment is obtainable as a ratio of a total area $S2a$ of inflow cells and a total area $S2b$ of outflow cells in the central segment to an area $S2$ of the central segment in the cross section perpendicular to the cell extending direction. In other words, the open frontal area of the central segment is obtainable in accordance with Equation (2) mentioned below.

$$(S1a+S1b)/S1 \times 100; \text{ and} \quad \text{Equation (1):}$$

$$(S2a+S2b)/S2 \times 100. \quad \text{Equation (2):}$$

As shown in FIG. 1 to FIG. 9, the plugging portion 3 is disposed in an open end of each cell 2 formed in each honeycomb segment 7 to plug the open end of the cell 2 on the side of one of the inflow end face 6a and the outflow end face 6b. In other words, the plugging portions 3 are arranged in the open ends of predetermined cells in the inflow end face 6a of each honeycomb segment 7 and the open ends of the residual cells 2 other than the predetermined cells in the outflow end face 6b of the honeycomb segment 7. Hereinafter, each cell 2 including the plugging portion 3 in its end portion on the outflow end face 6b side of the honeycomb segment 7 will be referred to as "an inflow cell 2a" sometimes. Furthermore, each cell 2 including the plugging portion 3 in the end portion of the cell 2 on the inflow end face 6a side of the honeycomb segment 7 will be referred to as "an outflow cell 2b" sometimes.

In the cross section of the honeycomb structure body 9 which is perpendicular to the extending direction of the cells 2, a ratio of an area of the specific circumferential segment 7ba to a total area of the circumferential segments 7b and the central segments 7a is 4% or more. According to this constitution, the regeneration efficiency of the plugged honeycomb structure 100 can further improve. It is preferable that the ratio of the area of the specific circumferential segment 7ba is from 4 to 60%.

Figure 10:
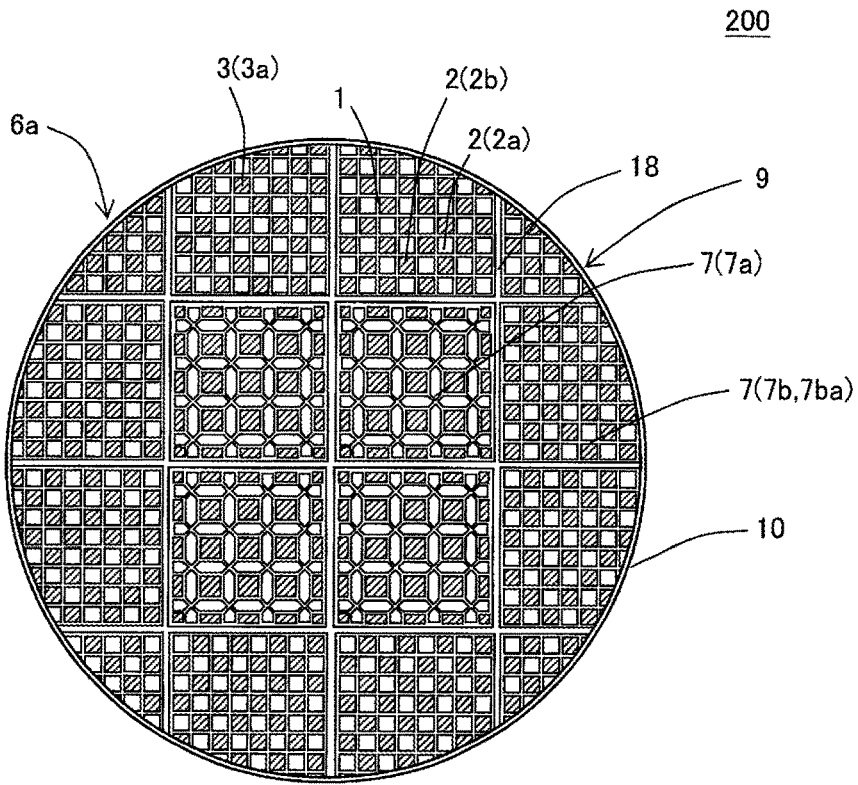
FIG. 10 is a plan view schematically showing another embodiment of the plugged honeycomb structure of the present invention and seen from an inflow end face side.

In the plugged honeycomb structure 100 shown in FIG. 1 to FIG. 9, four circumferential segments 7b arranged at four corners in 12 circumferential segments 7b arranged in the circumferential portion of the honeycomb structure body 9 are the specific circumferential segments 7ba. The specific circumferential segments 7ba may be the honeycomb segments 7 of parts of the circumferential segments 7b, but as shown in a plugged honeycomb structure 200 shown in FIG. 10, all circumferential segments 7b may be specific circumferential segments 7ba. FIG. 10 is a plan view schematically showing another embodiment of the plugged honeycomb structure of the present invention and seen from an inflow end face side.

In the plugged honeycomb structure 200 shown in FIG. 10, all the 12 circumferential segments 7b arranged in a circumferential portion of a honeycomb structure body 9 are the specific circumferential segments 7ba. It is preferable that the plugged honeycomb structure 200 shown in FIG. 10 is constituted similarly to the plugged honeycomb structure 100 shown in FIG. 1 to FIG. 9 except that all the circumferential segments 7b are the specific circumferential segments 7ba as described above. In FIG. 10, constituent elements constituted similarly to those of the plugged honeycomb structure 100 shown in FIG. 1 to FIG. 9 are denoted with the same reference numerals, and the description is omitted.

In the plugged honeycomb structure 100 shown in FIG. 1 to FIG. 9, it is preferable that the honeycomb segments 7 other than the specific circumferential segments 7ba are constituted as follows. Here, the honeycomb segments 7 other than the specific circumferential segments 7ba are the central segments 7a, and circumferential segments 7bb other than the specific circumferential segments 7ba. The honeycomb segments 7 other than the specific circumferential segments 7ba may only be the central segments 7a.

In the honeycomb segments 7 other than the specific circumferential segments 7ba, it is preferable that a shape of the inflow cells 2a in the cross section perpendicular to the extending direction of the cells 2 is hexagonal. In the present description, the above-mentioned "hexagonal shape" means an after-mentioned "substantially hexagonal shape". Furthermore, it is preferable that a shape of the outflow cells 2b in the cross section perpendicular to the extending direction of the cells 2 is square. In the present description, the above-mentioned "square shape" means an after-mentioned "substantially square shape". Furthermore, it is preferable that the plurality of cells 2 have a structure where four inflow cells 2a surround one outflow cell 2b so that one side of the predetermined inflow cell 2a and one side of the adjacent outflow cell 2b have the same length and are parallel to each other. In the present description, "the same length" and "parallel" mentioned above mean "about the same length" and "substantially parallel" which are mentioned later. In other words, each of four sides of the outflow cell 2b having a substantially square cross-sectional shape is adjacent to one side of the inflow cell 2a having a substantially hexagonal cross-sectional shape, and the adjacent sides have about the same length and are substantially parallel to each other. In this structure, the outflow cells 2b are not adjacent to each other, but the whole periphery of the outflow cell 2b is surrounded with four inflow cells 2a. According to this structure, the open frontal area of the outflow cell 2b can increase, and the number of the outflow cells 2b can be smaller than the number of the inflow cells 2a, and hence initial pressure loss can decrease.

In the present description, "the substantially hexagonal shape" means the hexagonal shape, a hexagonal shape including at least one curved corner portion, or a hexagonal shape including at least one linearly chamfered corner portion. "The substantially square shape" means the square shape, a square shape including at least one curved corner portion, or a square shape including at least one linearly chamfered corner portion. "About the same length" means the same length or a length of ±20% of the length. "Substantially parallel" means parallel, or a positional relation between two sides in a state where one of the two parallel sides is tilted in a range of ±15°.

Furthermore, as shown in FIG. 8 and FIG. 9, it is preferable that four sides 4 which exclude two sides 13 and 14 substantially parallel and adjacent to the outflow cells 2b in six sides of the inflow cell 2a are adjacent to sides 4 of the other inflow cells 2a adjacent to the outflow cells 2b, respectively. In other words, as shown in FIG. 8 and FIG. 9, it is preferable that a portion where four vertexes each of which is formed by two adjacent sides 4 in the inflow cell 2a meet one another has a structure where two partition walls 1 are perpendicular to each other. According to this structure, it is possible to maintain a high heat capacity of the partition walls 1, and it is possible to relieve thermal stress in a vertex portion in which PM is easily deposited during burning of the PM.

It is preferable that a distance a that is a distance between the partition wall 1 forming a first side 11 of the outflow cell 2b and the partition wall 1 forming a second side 12 facing the first side 11 of the outflow cell 2b is in a range in excess of 0.8 mm and smaller than 2.4 mm. Here, the distance a indicates the shortest distance connecting the center of the partition wall 1 forming the first side 11 in a thickness direction to the center of the partition wall 1 forming the facing second side 12 in the thickness direction. On the other hand, when a distance between the partition wall 1 forming a third side 13 of the inflow cell 2a which is substantially parallel and adjacent to one side of the outflow cell 2b and the partition wall 1 forming a fourth side 14 facing the third side 13 of the inflow cell 2a is defined as a distance b, a constitution mentioned below is preferable. In other words, it is preferable that a ratio of the distance b to the distance a is in a range in excess of 0.4 and smaller than 1.1. Here, the distance b indicates the shortest distance connecting the center of the partition wall 1 forming the third side 13 in the thickness direction to the center of the partition wall 1 forming the facing fourth side 14 in the thickness direction. A relation between the distance a and the distance b is adjusted in the above range, whereby the initial pressure loss and the pressure loss during the PM deposition preferably decrease with good balance.

Figure 11:
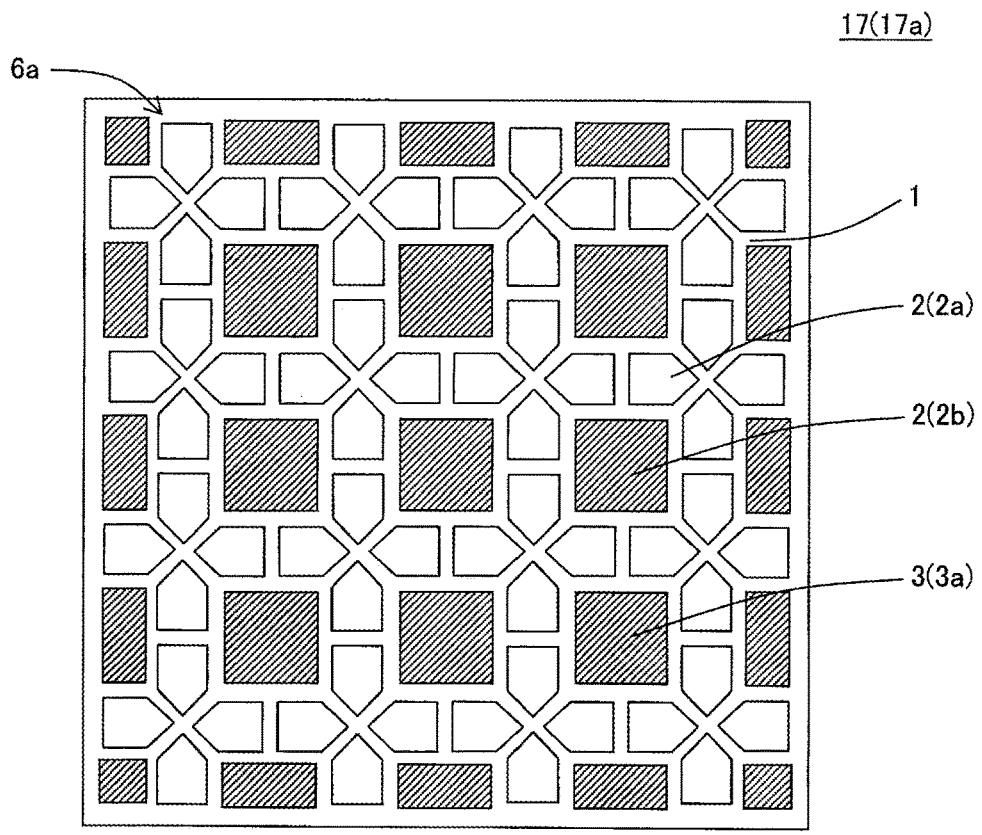
FIG. 11 is a plan view of an inflow end face of a central segment in still another embodiment of the plugged honeycomb structure of the present invention.
Figure 12:
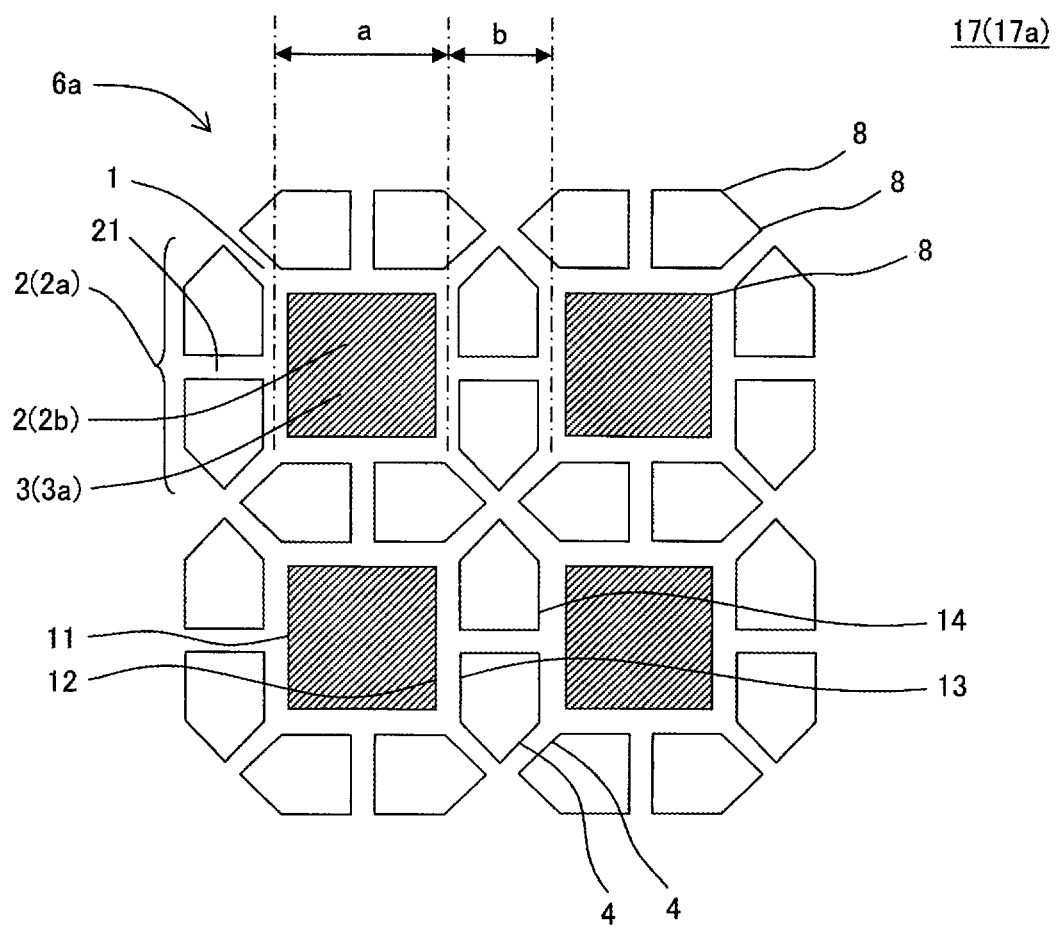
FIG. 12 is an enlarged plan view of an enlarged part of the central segment shown in FIG. 11.

Furthermore, the honeycomb segments 7 other than the specific circumferential segments 7ba may be constituted as in, for example, a central segment 17a constituted as shown in FIG. 11 and FIG. 12. FIG. 11 is a plan view of an inflow end face of the central segment in still another embodiment of the plugged honeycomb structure of the present invention. FIG. 12 is an enlarged plan view of an enlarged part of the central segment shown in FIG. 11. An inflow cell 2a in the central segment 17a shown in FIG. 11 and FIG. 12 may further include a dividing wall 21 connecting a central portion of a third side to a central portion of a fourth side in a direction perpendicular to the extending direction of the cells 2. The inflow cell 2a is divided into two spaces each having a substantially pentangular sectional shape by the dividing wall 21.

There are not any special restrictions on a material of the dividing wall 21, and a preferable material is suitably selectable from porous materials having a filtration ability. In view of easiness during preparation, it is preferable to employ the same material as in the partition walls 1. Furthermore, there are not any special restrictions on a thickness of the dividing wall 21, but from the viewpoints of the heat capacity and strength, it is preferable that the thickness is in a range of 0.1 to 0.5 mm. When the thickness is smaller than 0.1 mm, the thickness is unfavorable from the viewpoints of the heat capacity and strength. Furthermore, when the thickness is larger than 0.5 mm, the thickness is unfavorable from the viewpoint of acquisition of a filtration area. It is to be noted that in the present description, even when the dividing wall 21 is formed, it is considered that the inflow cell 2a is "apparently" substantially hexagonal.

As shown in FIG. 1 to FIG. 9, it is preferable that in the specific circumferential segments 7ba, shapes of the cells 2 in the cross section perpendicular to the extending direction of the cells 2 are quadrangular or are different between the inflow cell 2a and the outflow cell 2b. This constitution is preferable from the viewpoint of acquisition of a volume to deposit ash in an exhaust gas and in that pressure loss with deposited soot of the circumferential portion is suitably higher than that of the central portion. Examples of circumstances where the shapes of the cells 2 are different between the inflow cell 2a and the outflow cell 2b include circumstances where the shape of the inflow cell 2a is quadrangular and the shape of the outflow cell 2b is octagonal.

There are not any special restrictions on the whole shape of the plugged honeycomb structure 100. For example, the whole shape of the plugged honeycomb structure 100 shown in FIG. 1 is a round pillar shape including the inflow end face 6a and the outflow end face 6b which are round. Additionally, although not shown in the drawing, the whole shape of the plugged honeycomb structure may be a pillar shape including the inflow end face and outflow end face which have a substantially round shape such as an elliptic shape, a racetrack shape or an oblong shape. Alternatively, the whole shape of the plugged honeycomb structure may be a prismatic columnar shape including the inflow end face and outflow end face which have a polygonal shape such as a quadrangular shape or a hexagonal shape.

There are not any special restrictions on a material constituting the honeycomb segments, but from the viewpoints of strength, heat resistance, durability and the like, it is preferable that a main component is any oxide or nonoxide ceramic, a metal or the like. Specifically, it is considered that examples of ceramic include cordierite, mullite, alumina, spinel, silicon carbide, silicon nitride, and aluminum titanate. It is considered that examples of the metal include a Fe—Cr—Al based metal and metal silicon. It is preferable that the main component is one or at least two selected from these materials. From the viewpoints of high strength, high heat resistance and the like, it is especially preferable that the main component is one or at least two selected from the group consisting of alumina, mullite, aluminum titanate, cordierite, silicon carbide and silicon nitride. Furthermore, from the viewpoints of high thermal conductivity, high heat resistance and the like, silicon carbide or a silicon-silicon carbide composite material is especially suitable. Here, "the main component" means a component constituting 50 mass % or more, preferably 70 mass % or more, and further preferably 80 mass % or more of the honeycomb segments.

The specific circumferential segments may be different from the honeycomb segments other than the specific circumferential segments in, for example, the material constituting the honeycomb segments. In the hitherto described present embodiment, by use of the honeycomb segments having different cell shapes, the pressure loss with soot of each honeycomb segment varies, but by use of, for example, different materials constituting the honeycomb segments, the pressure loss with soot of each honeycomb segment may change.

Furthermore, when the specific circumferential segment are different from the honeycomb segments other than the specific circumferential segments in partition wall porosity and pore diameters, it is possible to adjust a value of the pressure loss with soot. However, in case of adjusting the value of the pressure loss with soot in accordance with the porosity and pore diameters of the partition walls, the pressure loss of the whole plugged honeycomb structure might be likely to increase. Furthermore, deterioration of thermal shock resistance (robust properties) of the plugged honeycomb structure might occur. Consequently, as to the specific circumferential segments and the honeycomb segments other than the specific circumferential segments, it is preferable to adjust the open frontal areas of the inflow cells to the same value or comparatively close values, and it is preferable to adjust the value of the pressure loss with soot in accordance with the cell structures of the respective honeycomb segments.

There are not any special restrictions on a material of the plugging portions. It is preferable that the material of the plugging portions includes one or at least two selected from the group consisting of various ceramics and the metal which are the above-mentioned examples of the preferable material of the honeycomb segments.

In the plugged honeycomb structure of the present embodiment, the plurality of honeycomb segments are bonded to one another via the bonding layer. According to this constitution, it is possible to disperse thermal stress applied to the plugged honeycomb structure, and it is possible to effectively prevent generation of cracks due to local temperature rise.

There are not any special restrictions on a size of each honeycomb segment. However, when the size of one honeycomb segment is excessively large, the effect of preventing the generation of the cracks might not sufficiently be exerted. Furthermore, when the size of the one honeycomb segment is excessively small, an operation of bonding the honeycomb segments via the bonding layer might be laborious.

There are not any special restrictions on a shape of the honeycomb segment. An example of the shape of the honeycomb segment is a prismatic columnar shape, and a cross section of the honeycomb segment which is perpendicular to the axial direction has a polygonal shape such as a quadrangular shape or a hexagonal shape. It is to be noted that the honeycomb segments arranged at the outermost circumference of the plugged honeycomb structure may be processed by grinding a part of the prismatic columnar shape in accordance with the whole shape of the plugged honeycomb structure.

A thickness of the bonding layer is preferably from 0.5 to 2 mm and further preferably from 0.8 to 1.5 mm. When the thickness of the bonding layer is smaller than 0.5 mm, the thermal shock resistance unfavorably deteriorates. When the thickness of the bonding layer is in excess of 2 mm, the pressure loss unfavorably heightens.

Furthermore, in one preferable example of the plugged honeycomb structure of the present embodiment, the respective honeycomb segments are constituted as mentioned below. In the inflow cells, a geometric surface area (GSA) is preferably from 10 to 30 $cm^2/cm^3$ and further preferably from 12 to 18 $cm^2/cm^3$. Here, the above-mentioned "geometric surface area (GSA)" is a value (S/V) obtained by dividing a total inner surface area (S) of the inflow cells by a total volume (V) of the honeycomb segment. In general, the larger the filtration area of a filter is, the more a thickness of PM deposited in the partition walls can decrease. Therefore, the geometric surface area (GSA) is adjusted in the above-mentioned numeric range, whereby it is possible to minimize the pressure loss of the plugged honeycomb structure. Consequently, when the geometric surface area (GSA) of the inflow cells is smaller than 10 $cm^2/cm^3$, the pressure loss during the PM deposition unfavorably increases. On the other hand, when the GSA is larger than 30 $cm^2/cm^3$, the initial pressure loss unfavorably increases.

In the plugged honeycomb structure of the present embodiment, a hydraulic diameter of each of the plurality of cells 2 is preferably from 0.5 to 2.5 mm and further preferably from 0.8 to 2.2 mm. When the hydraulic diameter of each of the plurality of cells is smaller than 0.5 mm, the initial pressure loss unfavorably increases. On the other hand, when the hydraulic diameter of each of the plurality of cells is larger than 2.5 mm, a contact area of the exhaust gas with the partition walls decreases, and a purification efficiency unfavorably deteriorates. Here, the hydraulic diameter of each of the plurality of cells is a value calculated in accordance with 4× (sectional area)/(circumferential length) based on the sectional area and circumferential length of each cell. The sectional area of the cell indicates an area of the shape (the sectional shape) of each cell appearing in a cross section of the plugged honeycomb structure which is vertical to a central axis direction, and the circumferential length of the cell indicates a length of a circumference of the sectional shape of the cell (a length of a closed line surrounding the cross section).

In view of trade-off among the initial pressure loss, the pressure loss during the PM deposition, and a trapping efficiency, it is preferable that the plugged honeycomb structure of the present embodiment simultaneously satisfies the conditions that the geometric surface area (GSA) of the inflow cells is from 10 to 30 $cm^2/cm^3$ and that the ratio of the open frontal area of each inflow cell is from 20 to 70% and that the hydraulic diameter of each of the plurality of cells is from 0.5 to 2.5 mm. Furthermore, it is further preferable to simultaneously satisfy the conditions that the geometric surface area (GSA) of the inflow cells is from 12 to 18 $cm^2/cm^3$ and that the ratio of the open frontal area of each inflow cell is from 25 to 65% and that the hydraulic diameter of each of the plurality of cells is from 0.8 to 2.2 mm.

In the plugged honeycomb structure of the present embodiment, a catalyst may be loaded onto the partition walls forming the plurality of cells. The loading of the catalyst onto the partition walls means coating of the surfaces of the partition walls and inner walls of pores formed in the partition walls with the catalyst. Examples of a type of catalyst include an SCR catalyst (zeolite, titania and vanadium), and a three-way catalyst containing at least two noble metals selected from the group consisting of Pt, Rh and Pd and at least one selected from the group consisting of alumina, ceria and zirconia. Thus, the catalyst is loaded, whereby it is possible to detoxify $NO_x$, CO, HC and the like included in the exhaust gas emitted from a direct injection type gasoline engine, the diesel engine or the like, and it is also possible to easily burn and remove the PM deposited on the surfaces of the partition walls by a catalytic function.

In the plugged honeycomb structure of the present embodiment, there are not any special restrictions on a method of loading such a catalyst as described above, and a method usually performed by the person skilled in the art is employable. Specifically, an example of the method is a method of wash-coating the structure with a catalyst slurry and then performing drying and firing.

(2) Manufacturing Method of Plugged Honeycomb Structure:

There are not any special restrictions on a manufacturing method of the plugged honeycomb structure of the present embodiment shown in FIG. 1 to FIG. 9, and the plugged honeycomb structure can be manufactured by, for example, a method mentioned below. Initially, a plastic kneaded material to prepare the honeycomb segments is prepared. The kneaded material to prepare the honeycomb segments can be prepared by suitably adding an additive such as a binder and water to a material selected as raw material powder from the above-mentioned suitable material of the honeycomb segments. As the raw material powder, for example, silicon carbide powder is usable. Example of the binder include methylcellulose and hydroxypropyl methylcellulose. Furthermore, another example of the additive is a surfactant.

Next, the kneaded material obtained in this manner is extruded to prepare a prismatic columnar honeycomb formed body having partition walls defining a plurality of cells and a segment circumferential wall disposed at the outermost circumference. A plurality of honeycomb formed bodies are prepared. It is to be noted that during the preparation of the honeycomb formed bodies, there may be prepared two types of honeycomb formed bodies, i.e., the honeycomb formed body forming the specific circumferential segment and the honeycomb formed body forming the honeycomb segment other than the specific circumferential segment.

Each obtained honeycomb formed body is dried with, for example, microwaves and hot air, and open ends of the cells are plugged with a material similar to the material used in preparing the honeycomb formed body, to prepare the plugging portions. The honeycomb formed body may further be dried after the plugging portions are prepared.

Next, the honeycomb formed body including the prepared plugging portions is fired, to obtain the honeycomb segment having the plugging portions. A firing temperature and a firing atmosphere vary with the raw materials, and the person skilled in the art can select the firing temperature and the firing atmosphere which are optimum for the selected material. Next, the obtained honeycomb segments are bonded to one another by use of a bonding material, and dried to harden, and then a circumference is processed to obtain a desirable shape, whereby the plugged honeycomb structure of the segmented structure is obtainable. As the bonding material, a paste material obtained by adding a liquid medium such as water to a ceramic material is usable. Furthermore, a processed surface obtained after the circumference of the honeycomb segment bonded body is processed has a state where the cells are exposed, and hence, as shown in FIG. 1, the processed surface may be coated with a circumference coating material to form the outer wall 10. As the circumference coating material, for example, the same material as the bonding material is usable.

EXAMPLES

Example 1

As a ceramic raw material, a mixed raw material was prepared by mixing silicon carbide (SiC) powder and metal silicon (Si) powder at a mass ratio of 80:20. An average particle diameter of the silicon carbide (SiC) powder was 20 µm. To this mixed raw material, hydroxypropyl methylcellulose was added as a binder, a water absorbable resin was added as a pore former, and water was also added to prepare a forming raw material. The obtained forming raw material was kneaded by using a kneader, to obtain a kneaded material.

Next, the obtained kneaded material was formed by using an extruder, to prepare 12 quadrangular prismatic columnar honeycomb segment formed bodies having the same cell arrangement pattern as in a honeycomb segment 17 shown in FIG. 12. It is to be noted that "a repeated arrangement pattern similar to the pattern of the honeycomb segment shown in FIG. 12" is an arrangement pattern in which eight inflow cells having a pentangular sectional shape are arranged to surround an outflow cell having a square sectional shape. The honeycomb segment formed bodies prepared here become central segments.

Next, the obtained kneaded material was formed by using the extruder, to prepare four quadrangular prismatic columnar honeycomb segment formed bodies having an arrangement pattern in which quadrangular cells and octagonal cells were alternately arranged. The honeycomb segment formed bodies prepared here become specific circumferential segments. Then, the four honeycomb segment formed bodies prepared in this manner were used as small segments at four corners of a circumference.

Next, the obtained two type of honeycomb segment formed bodies were dried by high frequency induction heating, and then further dried by using a hot air drier.

Plugging portions were formed in the dried honeycomb segment formed body. Initially, an inflow end face of the honeycomb segment formed body was masked. Next, a masked end portion (the end portion on the side of the inflow end face) was immersed into a plugging slurry to charge the plugging slurry into open ends of cells (outflow cells) which were not masked. Thus, the plugging portions were formed on the inflow end face side of the honeycomb segment formed body. Afterward, an outflow end face of the dried honeycomb segment formed body was similarly masked and immersed, to form plugging portions also in inflow cells.

Then, the honeycomb segment formed body including the formed plugging portions was degreased and fired to obtain a honeycomb segment. As to degreasing conditions, the degreasing was performed at 550° C. for 3 hours, and as to firing conditions, the firing was performed at 1450° C. in argon atmosphere for 2 hours.

The honeycomb segment for use as a central segment had such a cell arrangement pattern as shown in FIG. 12. The honeycomb segment for use as a specific circumferential segment had an arrangement pattern in which quadrangular cells and octagonal cells were alternately arranged. Table 1 shows, in a column of "configuration", the cell arrangement patterns of the honeycomb segments used in Example 1. It is to be noted that when Table 1 shows a drawing number such as FIG. 12 in the column of "configuration", it is meant that the cell arrangement pattern of the used honeycomb segment has a structure shown in the corresponding drawing. Furthermore, when Table 1 shows, for example, "quadrangular and octagonal" shapes in the column of "configuration", it is meant that the cell arrangement pattern of the used honeycomb segment has the described configuration.

A cross section of the prepared honeycomb segment which was perpendicular to an axial direction was square, and a length of one side of the square shape (a segment size) was 35 mm. Furthermore, a length of the honeycomb segment in the axial direction was 152 mm Table 1 shows a partition wall thickness (mm), a cell density (cells/cm$^2$) and open frontal area (%) of each honeycomb segment.

Next, 16 prepared honeycomb segments were monolithically bonded by using a bonding material (ceramic cement). There was used the bonding material including inorganic particles and an inorganic adhesive as main components and including an organic binder, a surfactant, a foamable resin, water and others as subcomponents. A circumference of a honeycomb segment bonded body obtained by monolithically bonding the 16 honeycomb segments was ground, the honeycomb segment bonded body was processed in a round pillar shape, and its circumferential surface was coated with a coating material, to obtain a plugged honeycomb structure of Example 1. A diameter of each end face of the plugged honeycomb structure of Example 1 was 144 mm.

TABLE 1

| | Central segment | | | | | Circumferential segment | | | |
|---|---|---|---|---|---|---|---|---|---|
| | Configuration | Partition wall thickness (mm) | Cell density (cells/cm²) | Open frontal area C (%) | Pressure loss with soot A (Ratio) | Configuration | Partition wall thickness (mm) | Cell density (cells/cm²) | Open frontal area D (%) | Pressure loss with soot B (Ratio) |
| Comparative Example 1 | Quadrangular and octagonal | 0.28 | 46.5 | 64 | 1 | Quadrangular and octagonal | 0.28 | 46.5 | 64 | 1 |
| Comparative Example 2 | Quadrangular and octagonal | 0.29 | 31 | 64 | 1 | Square | 0.28 | 46.5 | 64 | 1.1 |
| Comparative Example 3 | Quadrangular and octagonal | 0.4 | 46.5 | 64 | 1 | Quadrangular and octagonal | 0.4 | 46.5 | 58 | 1.4 |
| Comparative Example 4 | FIG. 12 | 0.34 | 31 | 64 | 0.7 | Quadrangular and octagonal | 0.4 | 46.5 | 58 | 1.3 |
| Comparative Example 5 | FIG. 8 | 0.29 | 46.5 | 64 | 0.75 | Quadrangular and octagonal | 0.4 | 46.5 | 58 | 1.2 |
| Comparative Example 6 | FIG. 12 | 0.34 | 31 | 64 | 0.7 | Quadrangular and octagonal | 0.4 | 46.5 | 64 | 1.3 |
| Comparative Example 7 | FIG. 12 | 0.34 | 31 | 64 | 0.7 | Quadrangular and octagonal | 0.4 | 46.5 | 64 | 1.3 |
| Example 1 | FIG. 12 | 0.34 | 31 | 64 | 0.7 | Quadrangular and octagonal | 0.28 | 46.5 | 64 | 1 |
| Example 2 | FIG. 12 | 0.34 | 31 | 64 | 0.7 | Quadrangular and octagonal | 0.28 | 46.5 | 64 | 1 |
| Example 3 | FIG. 12 | 0.34 | 31 | 64 | 0.7 | Quadrangular and octagonal | 0.28 | 46.5 | 64 | 1 |
| Example 4 | FIG. 12 | 0.34 | 31 | 64 | 0.7 | Quadrangular and octagonal | 0.28 | 46.5 | 64 | 1 |
| Example 5 | FIG. 12 | 0.34 | 31 | 64 | 0.7 | Quadrangular and octagonal | 0.28 | 46.5 | 64 | 1 |
| Example 6 | FIG. 12 | 0.34 | 31 | 64 | 0.7 | Quadrangular and octagonal | 0.28 | 46.5 | 64 | 1 |
| Example 7 | FIG. 8 | 0.29 | 31 | 64 | 0.75 | Quadrangular and octagonal | 0.28 | 46.5 | 64 | 1 |
| Example 8 | FIG. 8 | 0.29 | 31 | 64 | 0.75 | Square | 0.28 | 46.5 | 64 | 1.1 |
| Example 9 | FIG. 12 | 0.25 | 31 | 69 | 0.65 | Square | 0.25 | 46.5 | 69 | 0.9 |
| Example 10 | FIG. 8 | 0.25 | 31 | 69 | 0.65 | Square | 0.25 | 46.5 | 69 | 0.9 |
| Example 11 | FIG. 12 | 0.38 | 31 | 61 | 0.75 | Square | 0.25 | 46.5 | 69 | 0.9 |
| Example 12 | FIG. 8 | 0.35 | 31 | 61 | 0.78 | Square | 0.25 | 46.5 | 69 | 0.9 |

TABLE 2

| | Internal/external pressure loss ratio B/A (Ratio) | Internal/external open frontal area ratio D/C (Ratio) | Circumferential portion area ratio (%) | Evaluation result | | |
|---|---|---|---|---|---|---|
| | | | | Total pressure loss (Ratio) | Regeneration efficiency (%) | General evaluation |
| Comparative Example 1 | 1.00 | 1.00 | — | 1 | 50 | NG |
| Comparative Example 2 | 1.10 | 1.00 | 55 | 1.05 | 53 | NG |
| Comparative Example 3 | 1.40 | 0.91 | — | 1.2 | 60 | NG |
| Comparative Example 4 | 1.86 | 0.91 | 55 | 1.25 | 65 | NG |
| Comparative Example 5 | 1.60 | 0.91 | 55 | 1.18 | 63 | NG |
| Comparative Example 6 | 1.86 | 1.00 | 1 | 1.01 | 65 | NG |
| Comparative Example 7 | 1.86 | 1.00 | 2 | 1.02 | 65 | NG |
| Example 1 | 1.43 | 1.00 | 4 | 0.73 | 70 | OK |
| Example 2 | 1.43 | 1.00 | 10.3 | 0.76 | 72 | OK |
| Example 3 | 1.43 | 1.00 | 16.6 | 0.78 | 74 | OK |
| Example 4 | 1.43 | 1.00 | 22.9 | 0.8 | 77 | OK |
| Example 5 | 1.43 | 1.00 | 29.2 | 0.83 | 79 | OK |
| Example 6 | 1.43 | 1.00 | 55 | 0.85 | 82 | OK |

TABLE 2-continued

|  | Internal/external pressure loss ratio B/A (Ratio) | Internal/external open frontal area ratio D/C (Ratio) | Circumferential portion area ratio (%) | Evaluation result | | |
|---|---|---|---|---|---|---|
|  |  |  |  | Total pressure loss (Ratio) | Regeneration efficiency (%) | General evaluation |
| Example 7 | 1.33 | 1.00 | 55 | 0.9 | 85 | OK |
| Example 8 | 1.47 | 1.00 | 55 | 0.9 | 88 | OK |
| Example 9 | 1.38 | 1.00 | 55 | 0.85 | 92 | OK |
| Example 10 | 1.38 | 1.00 | 55 | 0.85 | 90 | OK |
| Example 11 | 1.20 | 1.13 | 55 | 0.85 | 75 | OK |
| Example 12 | 1.15 | 1.13 | 55 | 0.85 | 70 | OK |

Comparative Example 1

In Comparative Example 1, by use of a kneaded material prepared similarly to the kneaded material used in the preparation of the honeycomb segments of Example 1, there were prepared 16 honeycomb segments having a quadrangular prismatic columnar shape and having an arrangement pattern in which quadrangular cells and octagonal cells were alternately arranged. The prepared honeycomb segments had the same cell structure as the cell structure used in the specific circumferential segment of Example 1. In Comparative Example 1, the procedure of Example 1 was repeated except that all honeycomb segments were the above-mentioned honeycomb segments, to prepare a plugged honeycomb structure.

Examples 2 to 12 and Comparative Examples 2 to 7

The procedure of Example 1 was repeated except that honeycomb segments for use as central segments and circumferential segments were changed as shown in Table 1, to prepare plugged honeycomb structures of Examples 2 to 12 and Comparative Examples 2 to 7.

As to each of the plugged honeycomb structures of Examples 1 to 12 and Comparative Examples 1 to 7, "a pressure loss with soot when an amount of the deposited soot was 4 g/L" was measured by the following method. In the measurement of "the pressure loss with soot when the amount of the deposited soot was 4 g/L", there were performed three types of measurements, i.e., the measurement only in the central segments, the measurement only in the circumferential segments, and the measurement in the whole plugged honeycomb structure as described below.

A method of measuring the pressure loss with soot of the circumferential segments will be described. Initially, there were prepared a plurality of honeycomb segments having a cell structure similar to a cell structure of the circumferential segment of a measurement target. Next, by use of the plurality of prepared honeycomb segments, a plugged honeycomb structure was prepared in the same manner as in the plugged honeycomb structure having the circumferential segment of the measurement target. Next, the prepared plugged honeycomb structure was mounted in an exhaust system of a diesel engine for a car having a displacement of 2 L, and this diesel engine was operated, to deposit the soot in the plugged honeycomb structure. The diesel engine was operated at an engine rotation number of 2000 rotations/minute to obtain an exhaust temperature at 250° C. From the start of the operation of the diesel engine, a mass increase and the pressure loss due to the deposition of the soot were continuously measured, and the pressure loss when the amount of the deposited soot was 4 g/L was obtained as the pressure loss with soot of the circumferential segment.

A method of measuring the pressure loss with soot of the central segments will be described. Initially, there were prepared a plurality of honeycomb segments having a cell structure similar to a cell structure of the central segment of a measurement target. Next, by use of the plurality of prepared honeycomb segments, a plugged honeycomb structure was prepared in the same manner as in the plugged honeycomb structure having the central segment of the measurement target. Afterward, the pressure loss with soot of the central segment was measured in the same manner as in the above-mentioned method of measuring the pressure loss with soot of the circumferential segment.

As the pressure loss with soot of the whole plugged honeycomb structure, the pressure loss with soot was measured by using each of the plugged honeycomb structures prepared in the respective examples and comparative examples in the same manner as in the above-mentioned method of measuring the pressure loss with soot of the circumferential segment.

Table 1 shows, in a column of "pressure loss with soot A (ratio)" in the central segment, a ratio of "the pressure loss with soot" of the central segment of each of the examples and comparative examples when a value of the pressure loss with soot of the central segment of Comparative Example 1 is "1". Table 1 shows, in a column of "pressure loss with soot B (ratio)" in the circumferential segment, a ratio of "the pressure loss with soot" of the circumferential segment of each of the examples and comparative examples when a value of the pressure loss with soot of the circumferential segment of Comparative Example 1 is "1". Table 2 shows, in a column of "total pressure loss (ratio)", a ratio of "the pressure loss with soot" of each of the whole plugged honeycomb structures of the respective examples and comparative examples when a value of the pressure loss with soot of the whole plugged honeycomb structure of Comparative Example 1 is "1".

Table 2 shows, in a column of "an internal/external pressure loss ratio B/A", a ratio of "the pressure loss with soot B (ratio)" to "the pressure loss with soot A (ratio)". Table 2 shows, in a column of "an internal/external open frontal area ratio D/C", a ratio of "an open frontal area D (%)" to "an open frontal area C (%)". Table 2 shows, in a column of "circumferential portion area ratio", a ratio of an area of the specific circumferential segment to a total area of the circumferential segments and the central segments in the cross section perpendicular to the cell extending direction.

As to each of the plugged honeycomb structures of Examples 1 to 12 and Comparative Examples 1 to 7, a regeneration efficiency was measured by the following method. Furthermore, general evaluation was carried out on the basis of the measurement results of this regeneration efficiency by the following method. Table 2 shows the results.

(Regeneration Efficiency)

In a state where 6 g/L of soot was deposited to the partition walls of the plugged honeycomb structure, a high-temperature gas was passed from an inflow end face of the plugged honeycomb structure, to perform forced regeneration of the plugged honeycomb structure in which the soot was deposited. As to conditions of the forced regeneration, a gas temperature in the inflow end face was adjusted at 650° C., and a gas passing time was set to 15 minutes. Furthermore, a mass of the plugged honeycomb structure in which the soot was deposited was measured prior to the forced regeneration. After the forced regeneration, the mass of the plugged honeycomb structure was measured, and a mass of the soot lost by the forced regeneration was obtained. The regeneration efficiency (M2/M1×100) during the forced regeneration was obtained from a mass M1 of the deposited soot and a mass M2 of the soot lost by the forced regeneration. Table 2 shows the regeneration efficiency during the forced regeneration as "regeneration efficiency (%)".

(General Evaluation)

An example where "the total pressure loss (ratio)" of Table 2 was 1 or less and "the regeneration efficiency (%)" of the table was 70% or more was evaluated as "pass". When the general evaluation is "pass", Table 2 shows "OK" in a column of "general evaluation". An example where "the total pressure loss (ratio)" of Table 2 was in excess of 1 or "the regeneration efficiency (%)" of the table was smaller than 70% was evaluated as "failure". When the general evaluation is "failure", Table 2 shows "NG" in the column of "general evaluation".

(Result)

In each of the plugged honeycomb structures of Examples 1 to 12, "the total pressure loss (ratio)" was 1 or less, "the regeneration efficiency (%)" was 70% or more, and in the general evaluation, it was possible to obtain the evaluation of "pass". On the other hand, in each of the plugged honeycomb structures of Comparative Examples 2 to 7, "the total pressure loss (ratio)" was in excess of 1, and the regeneration efficiency was low.

A plugged honeycomb structure of the present invention is utilizable as a trapping filter to remove particulates and the like included in an exhaust gas.

DESCRIPTION OF REFERENCE NUMERALS

1: partition wall, 2: cell, 2a: inflow cell, 2b: outflow cell, 3: plugging portion, 3a; inflow side plugging portion, 3b: outflow side plugging portion, 4: side, 6a: inflow end face, 6b: outflow end face, 7 and 17: honeycomb segment, 7a and 17a: central segment, 7b: circumferential segment, 7ba: specific circumferential segment, 7bb: circumferential segment other than the specific circumferential segment, 8: corner portion, 9: honeycomb structure body, 10: outer wall, 11: first side, 12: second side, 13: third side, 14: fourth side, 18: bonding layer, 21: dividing wall, 100 and 200: plugged honeycomb structure, a: distance a, and b: distance b.

What is claimed is:

1. A plugged honeycomb structure comprising:
a pillar-shaped honeycomb structure body having porous partition walls arranged to surround a plurality of cells extending from an inflow end face to an outflow end face and forming through channels for a fluid; and
plugging portions each of which is disposed in an end portion of the cell on the side of one of the inflow end face and the outflow end face,
wherein the honeycomb structure body is constituted of a honeycomb segment bonded body having a plurality of prismatic columnar honeycomb segments, and a bonding layer bonding side surfaces of the honeycomb segments to one another,
the plurality of honeycomb segments include a plurality of circumferential segments arranged in a circumferential portion in a cross section of the honeycomb structure body which is perpendicular to an extending direction of the cells, and central segments which are the honeycomb segments other than the circumferential segments and are arranged in a central portion in the cross section,
the circumferential segments include at least one specific circumferential segment in which a pressure loss is at least 15% higher than a pressure loss of the central segment when 4 g/L of soot is deposited in the plurality of honeycomb segments, and in which an open frontal area of the at least one specific circumferential segment is the same as or larger than an open frontal area of the central segment, and
in the cross section of the honeycomb structure body which is perpendicular to the cell extending direction, a ratio of an area of the specific circumferential segment is 4% or more to a total area of the circumferential segments and the central segments.

2. The plugged honeycomb structure according to claim 1, wherein the cells including the plugging portions arranged in the end portions on the outflow end face side are defined as inflow cells, and the cells including the plugging portions arranged in the end portions on the inflow end face side are defined as outflow cells, and
in the honeycomb segments other than the specific circumferential segment,
a shape of the inflow cells in the cross section perpendicular to the cell extending direction is hexagonal,
a shape of the outflow cells in the cross section perpendicular to the cell extending direction is square,
the plurality of cells have a structure in which four inflow cells surround one outflow cell so that one side of the predetermined inflow cell and one side of the adjacent outflow cell have the same length and are disposed in parallel with each other,
a distance a, that is a distance between the partition wall forming a first side of the outflow cell and the partition wall forming a second side facing the first side of the outflow cell is in a range in excess of 0.8 mm and smaller than 2.4 mm,
a distance b, is a distance between the partition wall forming a third side of the inflow cell parallel and adjacent to the one side of the outflow cell and the partition wall forming a fourth side facing the third side of the inflow cell, and
a ratio of the distance b to the distance a is in a range in excess of 0.4 and smaller than 1.1.

3. The plugged honeycomb structure according to claim 2, wherein the inflow cell in the honeycomb segments other than the specific circumferential segment further includes a dividing wall connecting a central portion of the third side to a central portion of the fourth side in a direction perpendicular to the cell extending direction.

4. The plugged honeycomb structure according to claim 2, wherein honeycomb segments other than the specific circumferential segment are the central segments.

5. The plugged honeycomb structure according to claim 2, wherein in the specific circumferential segment, shapes of the cells in the cross section perpendicular to the cell extending direction are quadrangular or are different between the inflow cell and the outflow cell.

\* \* \* \* \*